United States Patent
Soulie et al.

(10) Patent No.: US 10,419,432 B2
(45) Date of Patent: Sep. 17, 2019

(54) METHOD AND APPARATUS FOR USE WITH DIFFERENT MEMORY MAPS

(71) Applicants: STMICROELECTRONICS SA, Montrouge (FR); STMICROELECTRONICS (GRENOBLE 2) SAS, Grenoble (FR); STMICROELECTRONICS S.R.L., Agrate Brianza (IT)

(72) Inventors: Michael Soulie, Chirens (FR); Riccardo Locatelli, Fontanil (FR); Valerio Catalano, Meylan (FR); Hajer Ferjani, Tunis (TN); Giuseppe Maruccia, Grenoble (FR); Raffaele Guarrasi, Grenoble (FR); Giuseppe Guarnaccia, Augusta (IT)

(73) Assignees: STMicroelectronics SA, Montrouge (FR); STMicroelectronics (Grenoble2) SAS, Grenoble (FR); STMicroelectronics S.R.L., Agrate Brianza (IT)

( * ) Notice: Subject to any disclaimer, the term of this patent is extended or adjusted under 35 U.S.C. 154(b) by 213 days.

(21) Appl. No.: 15/026,588

(22) PCT Filed: Oct. 17, 2014

(86) PCT No.: PCT/EP2014/072341
§ 371 (c)(1),
(2) Date: Mar. 31, 2016

(87) PCT Pub. No.: WO2015/055826
PCT Pub. Date: Apr. 23, 2015

(65) Prior Publication Data
US 2016/0226878 A1    Aug. 4, 2016

(30) Foreign Application Priority Data

Oct. 18, 2013 (GB) .................................. 1318478.3

(51) Int. Cl.
*H04L 29/06* (2006.01)
*G06F 12/08* (2016.01)
*G06F 12/06* (2006.01)

(52) U.S. Cl.
CPC .......... *H04L 63/10* (2013.01); *G06F 12/0646* (2013.01); *G06F 2213/0038* (2013.01)

(58) Field of Classification Search
CPC ............................ H04L 63/10; G06F 12/0646
See application file for complete search history.

(56) References Cited

U.S. PATENT DOCUMENTS

| 6,530,007 B2 | 3/2003 | Olarig et al. |
| 2006/0084432 A1* | 4/2006 | Balasubramanian ........................ H04W 74/004 455/434 |

(Continued)

FOREIGN PATENT DOCUMENTS

| CN | 1761344 A | 4/1996 |
| CN | 101086679 A | 12/2007 |
| EP | 2 605 143 A1 | 6/2013 |

OTHER PUBLICATIONS

British Search Report, dated Mar. 7, 2014, for corresponding British Application No. GB1318478.3, 1 page.

(Continued)

*Primary Examiner* — Farid Homayounmehr
*Assistant Examiner* — Suman Debnath
(74) *Attorney, Agent, or Firm* — Seed IP Law Group LLP (57) ABSTRACT

An apparatus has a data store configured to store access activity information. The access activity information indicates which one or more of a plurality of different access parameter sets is active. The data store is also configured to store access defining information, which defines, at least for each active access parameter set, a number of channels, (Continued)

location information of said channels, and interleaving information associated with said channels.

29 Claims, 9 Drawing Sheets

(56) References Cited

U.S. PATENT DOCUMENTS

2007/0283178 A1    12/2007    Dodeja et al.
2008/0320254 A1*   12/2008    Wingard ............ G06F 12/0607
                                                      711/157

OTHER PUBLICATIONS

International Search Report, dated Jan. 23, 2015, for corresponding International Application No. PCT/EP2014/072341, 4 pages.

* cited by examiner

METHOD AND APPARATUS FOR USE WITH DIFFERENT MEMORY MAPS

BACKGROUND

Technical Field

Embodiments relate in particular but not exclusively to a method and apparatus which can be used with different memory maps.

Description of the Related Art

A network on chip (NoC) uses packet based communication and a layered definition of the communication. Network on chips provide an interconnect between one or more initiators and their respective targets.

BRIEF SUMMARY

According to an aspect, there is provided an apparatus comprising: a data store configured to store access activity information and access defining information, said access activity information indicating which one or more of a plurality of different access parameter sets is active, said access defining information defining at least for the or each active access parameter set: a number of channels, location information of said channels, and interleaving information associated with said channels.

The access defining information may comprise memory map defining information. The channels may comprise memory channels. The access parameter sets may comprise memory map sets.

The interleaving information may comprise at least one of interleaving step size and location of an interleaved region in a channel.

The location of an interleaved region may be defined by at least one of a start location and an end location.

The access defining information may comprise quality of service information.

The apparatus may comprise a determination block configured to receive an input address, said determination block configured to determine which access parameter set said input address is associated and to provide channel information associated with said input address.

The determination block may have an access parameter set determiner configured to receive said input address and location information from said data store, said access parameter set determiner configured, based on said input address and said location information, to provide an output to a channel information provider.

The access parameter set determiner may comprise an address comparator configured to receive said input address and address range information and to provide an output to said channel information provider.

The access parameter set determiner may be configured to receive said access activity information.

The channel information provider may comprise at least one table configured to provide said channel information.

The at least one table may comprise channel number information.

The at least one table may comprise channel position information.

The access parameter set determiner may be configured to provide a control signal, said channel information provider may be configured to use said control signal to cause channel information for said determined access parameter set to be output.

The channel information may comprise at least one of channel position, channel number, interleaving step size and quality of service.

The apparatus may comprise a destination arrangement, said destination arrangement configured to determine a destination in dependence on said input address and channel information.

An integrated circuit or die may comprise an apparatus as described above.

The access activity information may be electronic device access activity information.

The access activity information may be peripheral device access activity information.

The access activity information may be electronic component access activity information.

The access defining information may comprise information defining a memory map to an electronic device, an electronic component or a combination thereof.

The access defining information may be electronic device access defining information.

The access defining information may be peripheral device access defining information.

The access defining information may be electronic component access defining information.

The access parameter sets may be electronic device access parameter sets.

The access parameter sets may be electronic component access parameter sets.

The access parameter sets may be peripheral device access parameter sets.

The electronic component may comprise a data storage component.

According to another aspect, there is provided a method of configuring an apparatus, said method comprising: providing access activity information for said apparatus indicating which one or more of a plurality of different sets is active, wherein access defining information at least for the or each active access parameter set, comprises a number of channels, location information of said channels, and interleaving information associated with said channels.

According to another aspect, there is provided a method comprising: using in an apparatus access activity information indicating which one or more of a plurality of different access parameter sets is active and access defining information, said access defining information defining at least for the or each active access parameter set a number of channels, location information of said channels, and interleaving information associated with said channels.

The interleaving information may comprise at least one of interleaving step size and location of an interleaved region in a channel.

The location of an interleaved region may be defined by at least one of a start location and an end location.

The access defining information may comprise quality of service information.

The method may comprise receiving an input address, determining with which access parameter set said input address is associated and providing channel information associated with said input address.

The method may comprise using said input address and location information to provide a channel information output.

The method may comprise comparing said input address and address range information to provide said channel information output.

The method may comprise providing a control signal to a channel information provider to cause channel information for said determined access parameter set to be output.

The channel information may comprise at least one of channel position, channel number, interleaving step size, and quality of service.

The method may comprise determining a destination in dependence on said input address and channel information.

The access activity information may be electronic device access activity information.

The access activity information may be peripheral device access activity information.

The access activity information may be electronic component access activity information.

The access defining information may comprise information defining a memory map to an electronic device, an electronic component or a combination thereof.

The access defining information may be electronic device access defining information.

The access defining information may be peripheral device access defining information.

The access defining information may be electronic component access defining information.

The access parameter sets may be electronic device access parameter sets.

The access parameter sets may be electronic component access parameter sets.

The access parameter sets may be peripheral device access parameter sets.

The electronic component may comprise a data storage component.

According to another aspect, there is provided a computer aided design tool configured to perform any of the above methods.

According to another aspect, there is provided a computer aided design tool configured to perform a method to configure a device, the method comprising: generating computer code to represent a default version of the device; modifying the computer code to provide access availability information for the device indicating which one or more of a plurality of different networks is available in the device, each available network having an access parameter set; and modifying the computer code to provide access defining information for each available access parameter set, each available access parameter set having: a number of channels, location information of said channels, and interleaving information associated with said channels.

The interleaving information may comprise at least one of interleaving step size and location of an interleaved region in a channel, wherein said location of an interleaved region is defined by at least one of a start location and an end location.

The method may comprise: modifying the computer code to configure the device to: receive an input address; determine with which access parameter set said input address is associated; and provide channel information associated with said input address.

The method may comprise: modifying the computer code to configure the device to: use said input address and location information to provide a channel information output; compare said input address and address range information to provide said channel information output; and provide a control signal to a channel information provider to cause channel information for said determined access parameter set to be output.

The channel information may comprise at least one of channel position, channel number, interleaving step size, and quality of service.

Generating computer code to represent the default version of the device may include generating the device with: at least two network interfaces; at least two routers; at least two links configured to pass packet-based communications, the at least two links coupling the at least two network interfaces through the at least two routers. The access activity information may be electronic device access activity information.

The access activity information may be peripheral device access activity information.

The access activity information may be electronic component access activity information.

The access defining information may comprise information defining a memory map to an electronic device, an electronic component or a combination thereof.

The access defining information may be electronic device access defining information.

The access defining information may be peripheral device access defining information.

The access defining information may be electronic component access defining information.

The access parameter sets may be electronic device access parameter sets.

The access parameter sets may be electronic component access parameter sets.

The access parameter sets may be peripheral device access parameter sets.

The electronic component may comprise a data storage component.

BRIEF DESCRIPTION OF THE SEVERAL VIEWS OF THE DRAWINGS

For a better understanding of some embodiments, reference is now made by way of example only to the accompany drawings. Non-limiting and non-exhaustive embodiments are described with reference to the following drawings, wherein like labels refer to like parts throughout the various views unless otherwise specified. One or more embodiments are described hereinafter with reference to the accompanying drawings in which.

DETAILED DESCRIPTION

Figure 1:
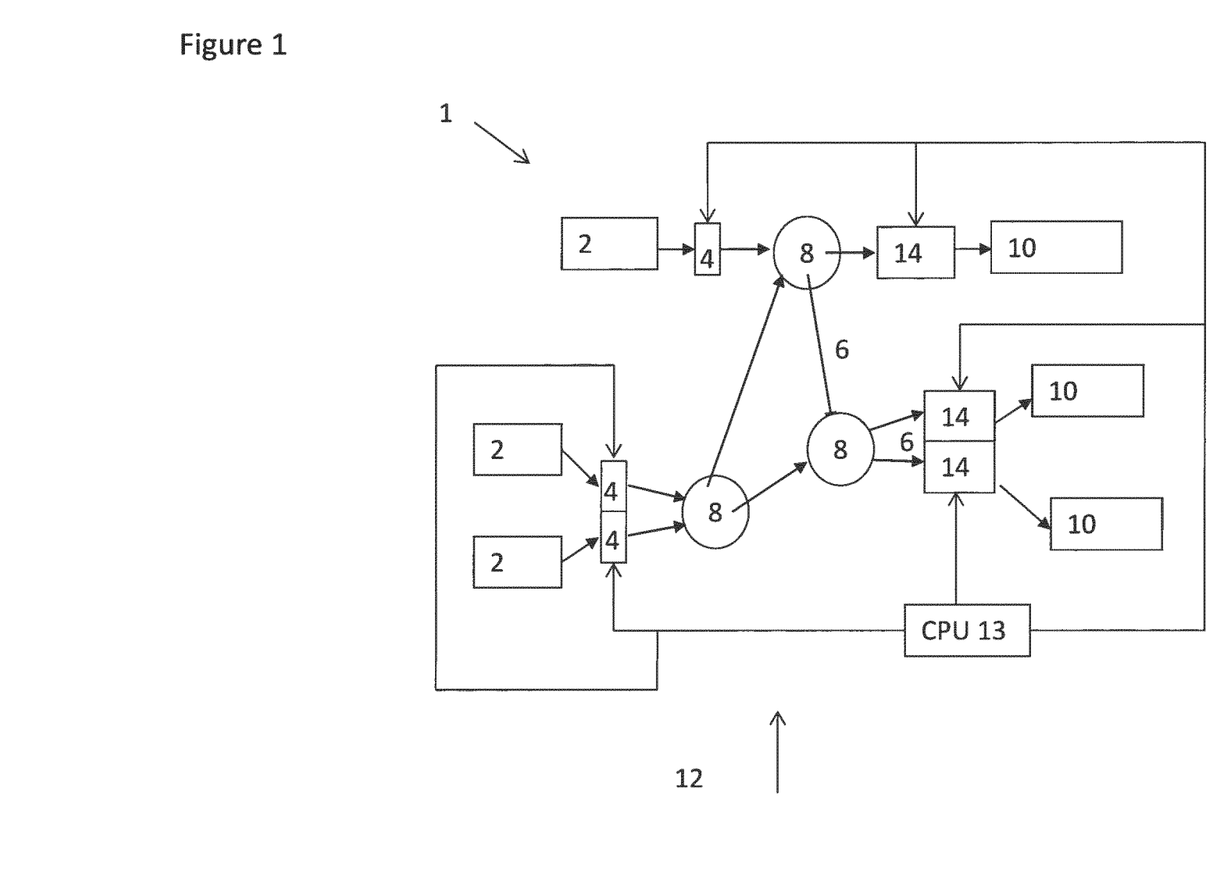
FIG. 1 shows schematically part of an electronics device in which some embodiments may be provided.

Reference is made to FIG. 1 which schematically shows part of an electronics device 1 in which embodiments may be provided. At least part of the device shown in FIG. 1 may be provided in an integrated circuit. In some embodiments, all of the elements shown in FIG. 1 may be provided in an integrated circuit. In alternative embodiments, the arrangement shown in FIG. 1 may be provided by two or more integrated circuits. Some embodiments may be implemented by one or more dies. The one or more dies may be packaged in the same or different packages. Some of the components of FIG. 1 may be provided outside of an integrated circuit or die.

The device 1 comprises a number of traffic initiators (also known as a master or source) 2 which are configured to communicate with various targets (or destinations) 10 and vice versa. The initiators may be any suitable device and by way of example may be one or more of a CPU (computer processor unit), transport stream processor, decoder, graphics processor, encoder, video display processor and graphics processor. It should be appreciated that these units are by way of example only and any other alternative or additional traffic initiator may be used. In the example shown in FIG. 1, there are three initiators. However, it should be appreciated that this is by way of example only and more or fewer than three initiators may be provided.

By way of example only, the targets may comprise one or more of a flash memory, a peripheral component interconnect (PCI), a double data rate memory (DDR) and an eRAM (embedded random access memory). It should be appreciated that these targets are by way of example only and any other suitable target may alternatively or additionally be used. More or fewer than the number of targets shown may be provided in other embodiments. In the example shown in FIG. 1, three targets are shown. However, it should be appreciated that this is by way of example only and more or fewer than three targets may be provided.

The various initiators and targets are able to communicate via a network on chip NoC 12. The NoC 12 comprises a respective network interface 4 for each of the respective initiators 2. In some embodiments, two or more initiators may share an interface. In some embodiments, more than one interface may be provided for a respective initiator. Likewise, an interface 14 is provided for each of the respective targets. In some embodiments two or more interfaces may be provided for a respective target. In some embodiments two or more targets may share the same interface.

The network interfaces 4, 14 are connected to one or more routers 8 via links 6. The routers are connected to each other via links 6. The network on chip shown in FIG. 1 is simplified and shows three routers. In practice, the network on chip may comprise many more than three routers. The topology may be regular, custom or any other suitable topology.

Some embodiments may have an on-chip interconnection which may be organized as a packet-based source routing and switching network-on-chip.

A CPU (computer processing unit) 13 is provided which is coupled to each of the network interfaces. The CPU may be configured to control the programming of the network interfaces.

Embodiments may be used in a wide range of applications. Some embodiments may be used in graphics and/or video applications. These applications may demand a relatively high bandwidth and relatively large memory buffers. Some applications may require two or more DDR memory controllers. In other words two or more channels may be required. Some applications may have security engines provided close to a memory for encryption and may for example use address-based filtering.

Figure 2:
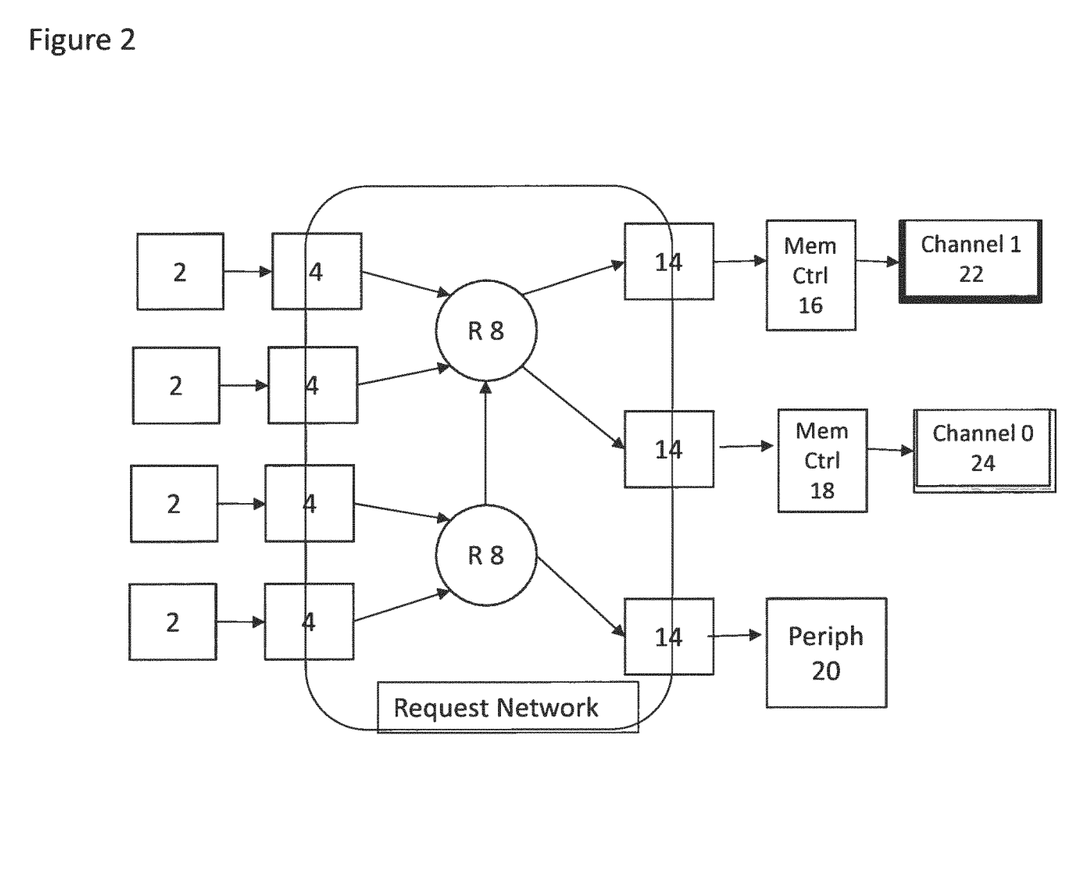
FIG. 2 shows an embodiment with a NoC with two DDR channels.

Reference is made to FIG. 2 which schematically shows an arrangement where two double data rate memories (DDRs) are used. In the example shown in FIG. 2 there are four traffic initiators 2. Each traffic initiator 2 is associated with a respective initiator network interface 4. A first memory controller 16 is provided along with a second memory controller 18. The first memory controller provides a first channel 22. The second memory controller 18 provides a second channel 24.

Also provided is a peripheral device 20. Each of the first and second memory controllers 16 and 18 as well as the peripheral device 20 has its own target network interface 14. Communication between the initiator network interfaces 4 and the target network interfaces 14 is via NoC and in particular, via the routers 8 of the NoC.

Figure 3:
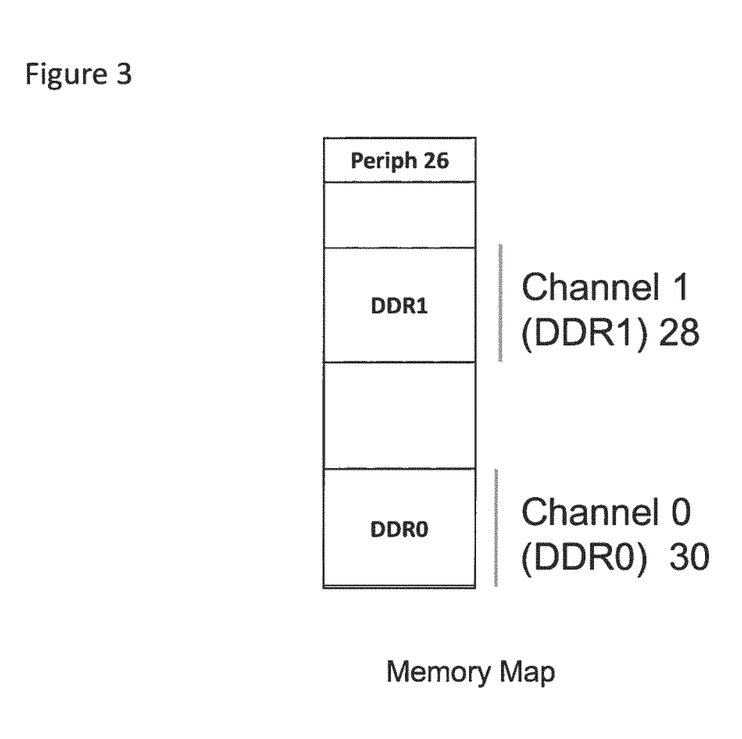
FIG. 3 shows a first memory map.

FIG. 3 shows a first example of a memory map. The first region 26 is associated with the first peripheral device. A second area 28 is for channel 1 and a third area 30 is assigned in the memory map for channel 0.

Figure 4:
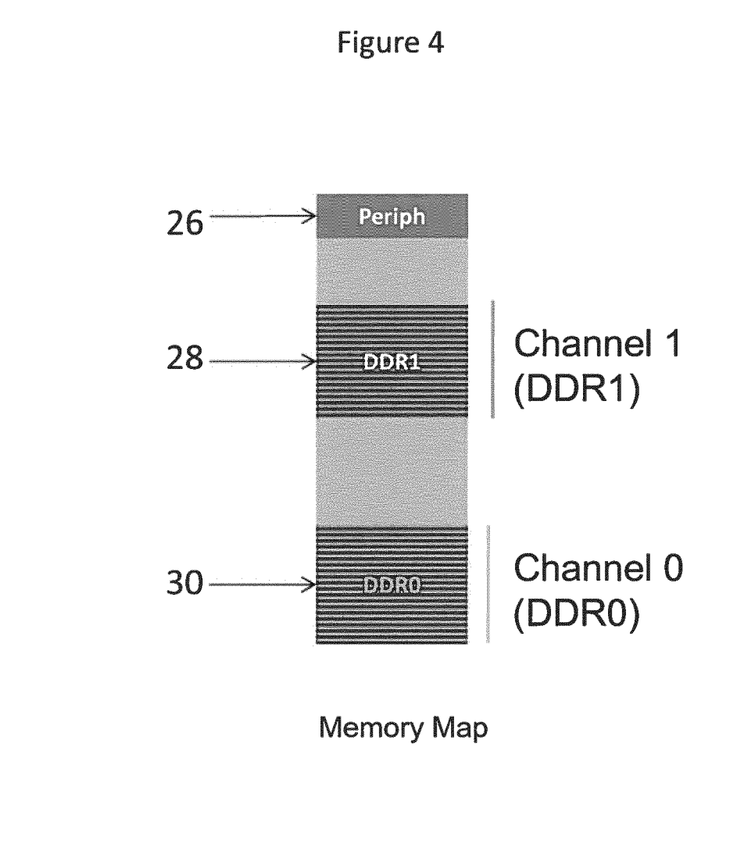
FIG. 4 shows a second memory map.

Reference is made to FIG. 4 which shows a second example of a memory map. In this arrangement, there is a first region allocated to the first peripheral device. Alternative memory locations are accessed alternatively via the respective channels. Accordingly a first memory region of a DDR is accessed by one memory controller, the next memory region is accessed via the other memory controller and so on.

Some embodiments may address one or more of the following.

The software may need to see a unique memory space in which to allocate entire buffers. Some applications may require relatively large buffers.

Some embodiments may require the memory space to be mapped over two or more channels.

In some embodiments, the load among the channels should be balanced to ensure a good overall SoC performance.

One die platform may be used for two or more different system on chips, products and/or technology market spaces.

It may desirable to have a unique memory map with a flexibility to adapt to different set ups. For example the platform may be used with different memory types.

Some embodiments may support post silicon configuration. For example configuration at BOOT time or during the product life may be supported. In some embodiments, it may be advantageous if in the design stage a common platform is used as this may make the circuit design phase simpler. The design stage may involve the use of CAD (computer aided design) tools.

Figure 5:
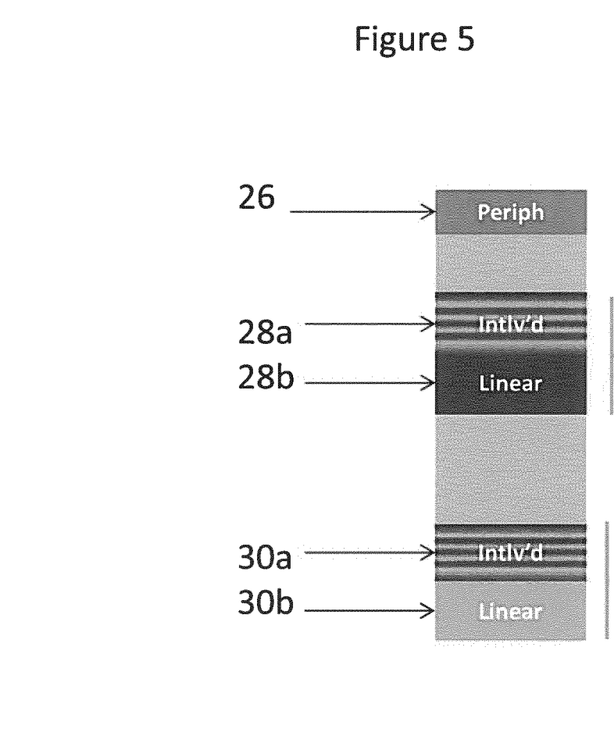
FIG. 5 shows a third memory map.

One possibility is to use an address interleaving approach where address bits are manipulated. Some possibilities allow the reprogramming of the interleaved regions such as shown in FIG. 5 within a particular channel. For example the range of the interleaved regions within a channel and/or the step size of the interleaved region within the channel may be altered. However, the number of channels, the size of the channels and the position of the channels are fixed.

Some embodiments may provide increased flexibility.

In some embodiments, there may be a memory map with fixed regions defined. For each initiator there is reprogrammable routing associated with each memory region. There is a programmable binding between an initiator, memory region and target.

In some embodiments, two or more interleaved memory region (IMR) sets are defined in parallel and controllable with a dedicated set of programmable tuning values. These values may comprise one or more of: number of channels, channel position, interleaving step size, range of interleaved memory and quality of service.

Some embodiments enable control per each IMR set. An IMR set can work at the same time as another IMR set or be active alternatively to one or more other IMR sets.

An Interleaved Memory Region Set (IMRSet) may be defined by one or more of:
  the Interleaved Channels for this set (number and location in the memory map);
  the Interleaved Memory Regions (IMR) in these channels; and
  the Interleaving Step.

An interleaved memory region set is composed of interleaved memory regions.

At configuration time, different interleaved memory region sets can overlap: an address range (that is the IMR) can belong to interleaved memory region of a first IMR set 1 and to an interleaved memory region of a second IMR set 2.

At runtime different active interleaved memory region sets cannot overlap: if an address range belongs to a first active interleaved memory region set 1, then that region cannot be part of any other active interleaved memory region set.

The activity of a memory region set may be controlled at runtime through dedicated registers.

Any suitable number of different IMRSets may be supported. Different IMRSets may be appropriate for different uses or applications of the platform.

A channel may be considered as a system target on which address interleaving can apply. By way of example a channel may be a DDR memory controller or any other suitable device. A channel may be considered as a sequence of adjacent contiguous memory ranges (node map entries) which are (or will be after routing reprogramming) associated to a NoC target network interface.

Channels may be of different sizes. Interleaving may only apply at most on the smallest size among channel sizes or the Maximum Common Channel Size (MCChS).

The number of channels may be a power of two. By way of example only, a NoC or some embodiments may support interleaving on 2, 4, 8, and 16 channels. However, it should be appreciated that the number of channels can be any value. The interleaving algorithm implementation may be optimized when channels number is a power of 2.

Preferably the channels are mapped to addresses aligned to their size. If the channel size is not a power of two, then the channel may be mapped to addresses aligned to the power of 2 immediately greater than its size, in some embodiments. For example, channels of 750 MB may be mapped to addresses aligned at 1 GB.

An interleaved memory region (IMR) may be fully and univocally defined by a start address, an end address and an offset value.

The IMR start address and the IMR end address may define a continuous memory region within the channel in the address map. The IMR start address and IMR end address may be programmable through dedicated registers. In some embodiments, only a relevant subset of address bits, for example [MSB:LSB], (most significant bit, least significant bit) of start and end addresses may be used to understand if an access is being done to an interleaved region.

For an IMR set, the above-mentioned MSB may be imposed by the channel of greatest size. In some embodiments, if the greatest channel size is a power of 2, then MSB=log 2[greatest channel size]−1. If the greatest channel size is not a power of two, then MSB=log 2[immediately greater power of 2]−1.

Consider the following example. If the greatest channel size is of 256 MB (that is a power of 2), the address MSB considered is log 2[256 MB]=27.

If greatest channel is of 768 MB (not a power of 2), address MSB considered is log 2[1024 MB]=29.

In some embodiments, the minimal IMR size may be defined as 16 MB. Then the above-mentioned LSB may be set to 23.

The offset may be a value used for the NoC interleaving algorithm. This value may not be accessible to a user and may be assigned at configuration time.

All interleaved memory regions IMR providing an interleaved memory region set may comply with the following rules;

The size of the channel interleaved memory region may be the same across all the channels within an interleaved memory region set; and The interleaved memory region may have a start and end address defining a set of interleaved memory regions.

These rules may define the interleaving pattern for each interleaved memory region set.

In some embodiments, the IMR size is a multiple of a step×number of channels.

In an interleaved memory region set IMR set, the step represents the size of the address range that will be contiguously mapped in a target device.

All the transactions having their address between the interleaved memory region IMR start address and the step value will be routed towards one channel.

All the transactions having their address in the subsequent step address slice will be routed towards the subsequent channel, and so on. If N is the number of channels, then the (N+1)th step address slice is routed to first channel again.

The step may be a power of 2. A minimal value for step will depend on the transaction granularity and for example in some embodiments may be 256 bytes.

Figure 6:
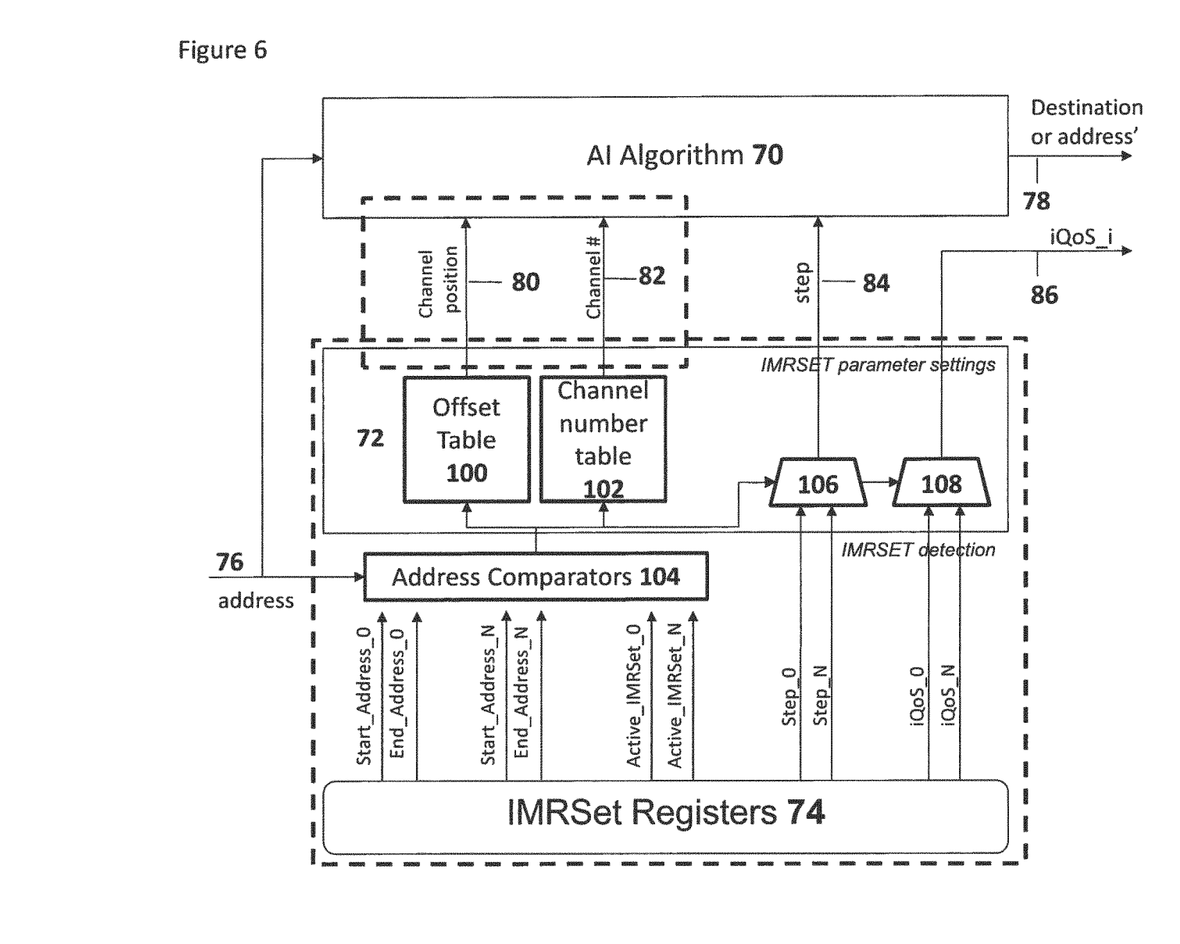
FIG. 6 schematically shows an embodiment.

Reference is made to FIG. 6 which schematically shows address interleaving logic. The arrangement comprises an address interleaving block 70 which is configured to run the address interleaving algorithm. The block also comprises an IMR set block 72 which is configured to identify the IMR set which is active for a particular address and set the appropriate electronic device access parameters which are used by the address interleaving block. A plurality of IMRSet registers 74 is also provided.

Figure 7:
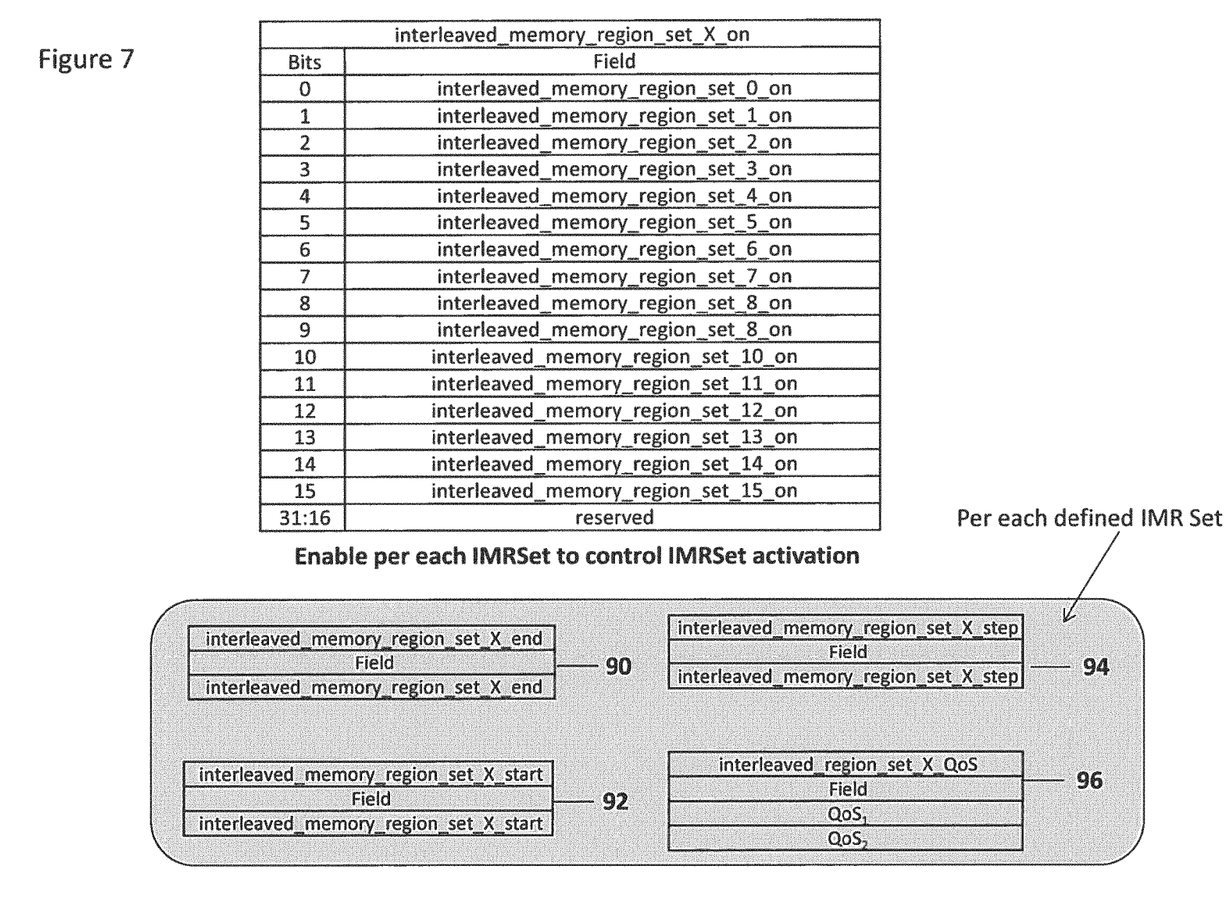
FIG. 7 schematically shows the registers of FIG. 6 in more detail.

The IMRSet registers 74 will now be described in more detail with reference to FIG. 7. For each IMR set, registers will be provided to store one or more of the following:
  the end address of each interleaved memory region of the set;
  the start address of each interleaved memory region of the set;
  the step value in the interleaved memory regions: and
  the quality of service value(s) in the interleaved memory region set.

Also provided is a register 98 which indicates whether or not a particular IMR set is active. In some embodiments, only one IMR set may be active at a time. However, in other embodiments, two or more memory region sets may be active during the operation of a device if the memory regions do not overlap. In the example shown in FIG. 7, 16 memory set options are shown. However, this is by way of example only and in other embodiments, more or fewer than 16 memory set options may be available.

This register 98 thus controls the activity of each interleaved memory region set. An enable is provided for each IMR set to control the IMR set activation.

Each memory map region may be assigned, as part of the channel, to an IMR set. A region can be part of one or more IMR sets. This association may be set up during design time of the device.

Turning back to FIG. 6, the IMR set block 72 is configured to receive an address 76. Through address decoding, the IMR set block 72 is configured to detect if the current transaction is part of a region and which IMR set can be active in the region. This determination is based on the information stored in the IMR set registers 74. It should be appreciated that the IMR set block 72 will only consider information from those IMR sets which are active. The IMR set block 72 is configured to provide information about the channel position 80 and the channel number 82 for the input address 76. The IMR set block is also configured to provide step size information 84 and Quality of service information 86. It should be appreciated that to discriminate where there are more than one IMR sets active at the same region, a consideration of the start and/or end addresses is used to understand which IMR set is being addressed by the current transaction.

The IMR set block 72 will now be described in more detail. The input address 76 is input to address comparators 104 of the IMR set detection part of the block 72. The IMR set registers 74 provide the start address and end address of each of the IMR regions for each IMR set. The address comparators identify if the input address falls between a start address and an end region of an IMR. Additionally, the IMR registers 74 provide information for each IMR set indicating if that IMR set is active or not. Thus if an address falls within an interleaved memory region of an interleaved memory set which is active, this will be determined by the address comparators.

The IMR set parameter setting part of the block 72 comprises an offset table 100 and a channel number table 102. These tables receive an output from the address comparators 104. The offset table 100 is configured to provide the channel position output 80. The channel number table 102 is configured to provide the channel number, that is, the number of channels which are interleaved in the IMR region.

The IMR set parameter setting part of the block 72 also comprises a first multiplexer 106 and a second multiplexer 108. The multiplexer 106 is configured to receive N+1 inputs indicating the step size for each of the IMR sets. The first multiplexer 106 is controlled by the output of the address comparator 104 to select the step size of the active IMR set within which the address falls. This is output as the step output 84. Likewise, the second multiplexer 108 receives quality of service information for each of the N+1 sets. The output of the address comparator 104 is used to select the quality of service associated with the active set within which the address falls. This provides the quality of service output 86.

In some embodiments, the offset table and the channel-number table may be hardware tables. These tables may be set by an electronic design automation EDA tool. The tables will depend on the IMRset or sets which are to be active for a given use of the resulting product.

Alternatively in some embodiments, the tables may be a set of additional registers which can be written by the system on chip software at run time. A tool may be used to provide to the software the right configuration alternatives that can be downloaded in the registers. This additional set of registers may be provided per IMR set. The number of IMR sets will be for example the number of IMR set configurations that can be activated at the same time on the system on chip.

Figure 8A:
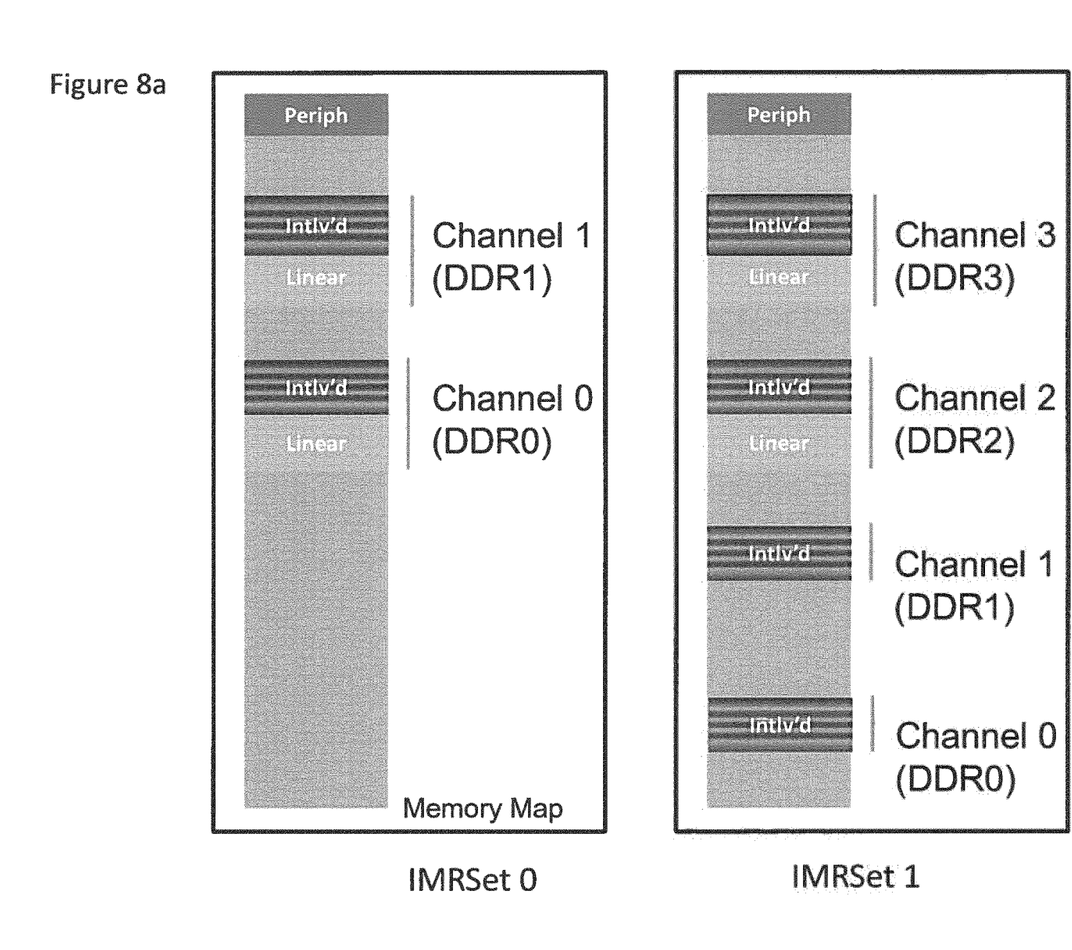
FIG. 8a shows a first example of two interleaved memory region sets.
Figure 8B:
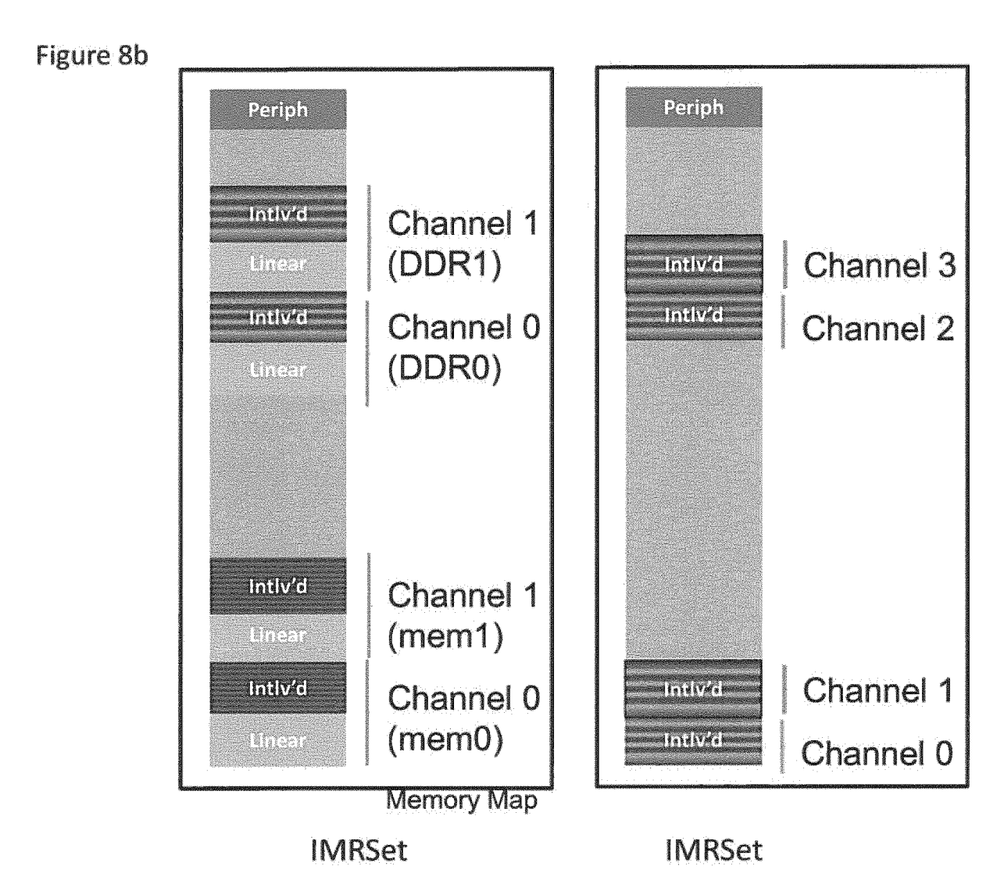
FIG. 8b shows a second example of two interleaved memory region sets.
Figure 8C:
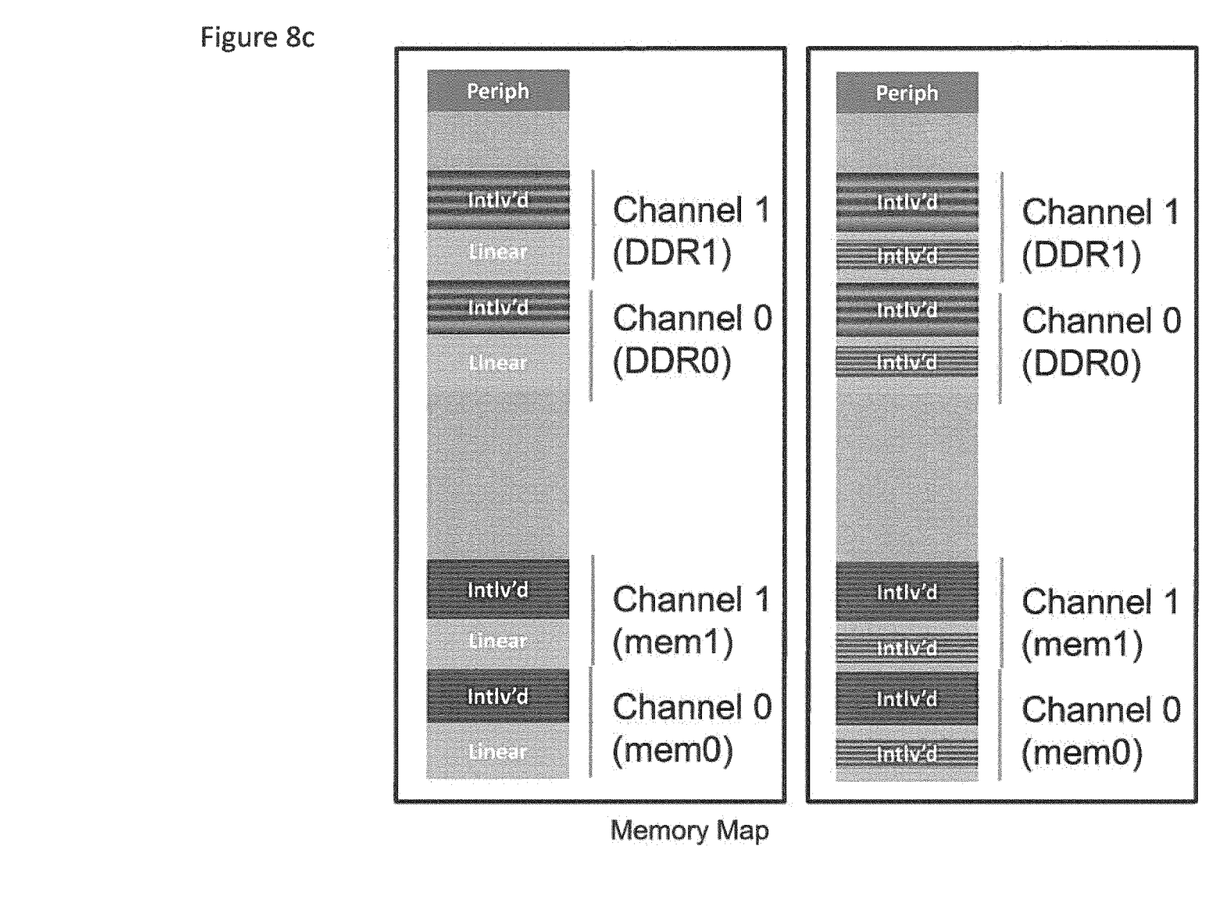
FIG. 8c shows a third example of two interleaved memory region sets.

Reference is now made to FIGS. 8a to 8c which show some examples of different IMR sets. In some embodiments, all of the shown IMR sets may be supported. In other embodiments alternative or additional IMR sets may be supported. In some embodiments, two or more IMR sets may be in different places in the memory map and so may be active at the same time.

In the example of FIG. 8a, one IMR set, set 0 has a first channel, channel 0, associated with a first memory controller for accessing a DDR and a second channel, channel 1, associated with a second memory controller for accessing the DDR. Each of these channels is provided with a linear part and an interleaved part. A second IMR set, set 1 is provided which has four channels. Two of the channels, channel 0 and channel 1 only have an interleaved part and are respectively associated with a first memory controller and a second memory controller for accessing the DDR. The third and fourth channels, channels 2 and 3, are also for accessing the DDR but via respective third and fourth memory controllers. The third and fourth channels are each provided with a linear part and an interleaved part.

These two sets would not be active at the same time as they contain overlapping memory regions. Thus the same device is able to support two channel interleaving if IMR set 0 is used and four channel interleaving if IMR set 1 is used. Two channel interleaving may be used where there are two memory controllers for accessing the DDR and four channel interleaving may be used where there are four memory controllers for accessing the DDR. IMR set 1 supports different memory interleaving needs (e.g., all of a channel being interleaved) as compared to IMR set 0.

Reference is now made to FIG. 8b which shows two different IMR sets. The first set shown supports two channels for accessing a DDR via two memory controllers and two channels for a accessing a different type of memory via two, different, memory controllers. Each of the channels has a linear part and interleaved part.

The second IMR set has four channels. All four of the channels may be accessing a DDR via four memory controllers. All of the channels only have a interleaved part and no linear part.

The first set may have four channels with an interleaving of 512 MB and the second set may have four channels with an interleaving of 256 MB. This allows a system on chip configuration with different memory sizes to be supported. Alternatively or additionally, this allows a system on chip configuration with different memory interleaving needs to be supported.

Reference is made to FIG. 8c which shows a first IMR set which is the same as the first IMR set of FIG. 8b.

FIG. 8c shows a second IMR set which supports two channels for the DDR and two channels for a different memory as with the first IMR set. However in the second IMRset, each channel has two interleaved regions.

In a given IMRSet, all the channels may be interleaved.
In a given IMRset, the step size may be a constant for all the channels.

The first set may have interleaving region 512 MB while the second set may have an interleaving step of 256 MB. The first set may have a step of 1 MB and the second set may have a step size of 4 KB.

In some embodiments, the interleaved region size may be in the region of 256 MB to 1 GB while the step may be in a range of 4 KB to 16 MB.

The different sets may be used to support different memory sizes and/or different memory interleaving needs.

The address interleaving block 70 may use the NoC to provide support for two or more channels (memory controllers) for accessing a memory.

The software may see a unique memory space but the NoC dispatches and balances the traffic towards the two or more memory channels (such as two memory controllers). In embodiments, the NoC address interleaving used allows the offering of unique memory spaces that are automatically mapped among two or more channels balancing the traffic.

In some embodiments, the original address is not changed. This may reduce the system cost. This may be advantageous with security features as the address is not altered. In some embodiments, the routing associated with the address may be changed but the actual address and memory space accessed by that address is not changed.

If it is detected that the incoming transaction address is part of an interleaved memory region, then the interleaved destination channel for this address is determined. For example the determination may be based on the following:

channel=(address[log 2(MCChS)−1,log 2(step)]+ offset)modulo number of channels.

The above determination may be optimized if the number of channels is a power of 2 (the offset is the channel position provided by the offset table).

channel=(address[log 2(step)+log 2(channel #)−1,log 2(step)]+offset)Modulo number of channels.

This optimization may use fewer bits in the channel computation. It should be appreciated, that this is only one way of determining which channel is used for which interleaved region.

Finally, the corresponding routing path is assigned to this transaction.

When an Initiator Network Interface receives a request, the address of the request is compared to the currently activated interleaved channel memory regions start address(es) and end address(es) to understand if channel computation is required or not.

If channel computation is not required, the routing information may be retrieved from a current routing table in the AI block.

If channel computation is required, then the channel is computed. Once a request to a currently activated IMR Set is detected, the destination channel for this request is determined. This is based on the offset. As mentioned previously, the offset is a value assigned during configuration to each interleaved channel of the considered IMR Set. The destination channel may be computed using the above definitions.

After the destination channel computation, the final step is to encode the network layer encoder with the correct routing information. The routing information is retrieved from the look up table based on the destination channel. In some embodiments, a look up table entry may be provided only routing to a different channel to a default channel associated with a memory region.

If several routing paths are possible for a transaction (because the channel is spread on several node map entries having different routing paths) then a reference routing path is assigned (RIRC). A reference routing path for each IMR may be defined at design time.

In some embodiments, the request packet header may be encoded with the routing table information.

Embodiments may be applied in a wide range of technologies and applications. For example, embodiments may be used in a set top box, a Digital Television (DTV), and an application processor in a multimedia convergence application. Embodiments may be used in communications devices such as mobile phones, smart phones or the like.

Some of the embodiments have been described in relation to a DDR controller. It should be appreciated that this is by way of example only and the target may be any suitable entity. The target may be a different type of memory or any other suitable type of target. For example the memory may be an embedded static random access memory (eSRAM). The target could be any suitable peripheral device and in some embodiments may be a peripheral register access point. Alternative embodiments may use any suitable interconnect instead of the example Network-on-Chip.

Some embodiments may allow a plurality of different IMRsets to be supported. In some embodiments, the IMRset used may be changed during the use of the hardware. In other embodiments, the IMRset or sets which are to be used with the hardware are set up during design time and only the values of the IMRset or sets which are used are stored in the registers. In this way the same hardware configuration can be used to support a number of different applications and/or uses of the hardware.

Some embodiments may comprise configuring of the device when it is in the CAD (computer aided design) tool or similar phase. In other words, the device or apparatus is not a physical device but is represented by computer software, computer code and/or the like. Such a representation may be created by one party and stored on a machine-readable medium for subsequent transfer to another party by some appropriate means.

Whilst this detailed description has set forth some embodiments of the present invention, the appending claims cover other embodiments of the present invention which differ from the described embodiments according to various modifications and improvements. Other applications and configurations may be apparent to the person skilled in the art.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An integrated circuit apparatus, comprising:
at least two network interfaces;
at least two routers;
at least two links configured to pass packet-based communications, the at least two links coupling the at least two network interfaces through the at least two routers; and
a processor to control programming of the at least two network interfaces based on a data store, the data store configured to store electronic device access activity information and electronic device access defining information, the electronic device access activity information indicating which one or more of a plurality of different electronic device access parameter sets is active and said electronic device access defining information defining at least for each active electronic device access parameter set:

a number of channels formed in one or more sequences of adjacent contiguous memory ranges, wherein each channel is arranged to pass packet-based data via one or more of the at least two links, one or more of the at least two routers, and one or more of the at least two network interfaces, location information of said channels, and interleaving information associated with said channels.

2. The integrated circuit apparatus as claimed in claim 1, wherein interleaving information comprises at least one of interleaving step size and location of an interleaved region in a channel.

3. The integrated circuit apparatus as claimed in claim 2, wherein said location of an interleaved region is defined by at least one of a start location and an end location.

4. The integrated circuit apparatus as claimed in claim 1, wherein said electronic device access defining information comprises quality of service information.

5. The integrated circuit apparatus as claimed in claim 1, comprising a determination block configured to receive an input address, said determination block configured to determine which electronic device access parameter set said input address is associated and to provide channel information associated with said input address.

6. The integrated circuit apparatus as claimed in claim 5, wherein said determination block has an electronic device access parameter set determiner configured to receive said input address and location information from said data store, said electronic device access parameter set determiner configured, based on said input address and said location information, to provide an output to a channel information provider.

7. The integrated circuit apparatus as claimed in claim 6, wherein said electronic device access parameter set determiner comprises an address comparator configured to receive said input address and address range information and to provide an output to said channel information provider.

8. The integrated circuit apparatus as claimed in claim 6, wherein said electronic device access parameter set determiner is configured to receive said electronic device access activity information.

9. The integrated circuit apparatus as claimed in claim 6, wherein said channel information provider comprises at least one table configured to provide said channel information.

10. The integrated circuit apparatus as claimed in claim 9, wherein said at least one table comprises channel number information.

11. The integrated circuit apparatus as claimed in claim 9, wherein said at least one table comprises channel position information.

12. The integrated circuit apparatus as claimed in claim 6, wherein said electronic device access parameter set determiner is configured to provide a control signal, said channel information provider configured to use said control signal to cause channel information for said determined electronic device access parameter set to be output.

13. The integrated circuit apparatus as claimed in claim 6, wherein said channel information comprises at least one of channel position, channel number, interleaving step size, and quality of service.

14. The integrated circuit apparatus as claimed in claim 6, comprising a destination arrangement, said destination arrangement configured to determine a destination in dependence on said input address and channel information.

15. A method of configuring, by an integrated circuit of an apparatus, said method comprising:

providing at least two network interfaces;

providing at least two routers;

providing at least two links configured to pass packet-based communications, the at least two links coupling the at least two network interfaces through the at least two routers; and providing a processor to control programming of the at least two network interfaces based on activity information provided for said apparatus indicating which one or more of a plurality of different electronic device access parameter sets is active, wherein electronic device access defining information for each active electronic device access parameter set, comprises:

a number of channels formed in one or more sequences of adjacent contiguous memory ranges, wherein each channel is arranged to pass packet-based data via one or more of the at least two links, one or more of the at least two routers, and one or more of the at least two network interfaces, location information of said channels, and interleaving information associated with said channels.

16. The method as claimed in claim 15, wherein interleaving information comprises at least one of interleaving step size and location of an interleaved region in a channel.

17. The method as claimed in claim 16, wherein said location of an interleaved region is defined by at least one of a start location and an end location.

18. The method as claimed in claim 15, wherein said electronic device access defining information comprises quality of service information.

19. The method as claimed in claim 15, comprising:

receiving an input address;

determining with which electronic device access parameter set said input address is associated; and providing channel information associated with said input address.

20. The method as claimed in claim 19, comprising:

using said input address and location information to provide a channel information output.

21. The method as claimed in claim 20, comprising:

comparing said input address and address range information to provide said channel information output.

22. The method as claimed in claim 19, comprising:

providing a control signal to a channel information provider to cause channel information for said determined electronic device access parameter set to be output.

23. The method as claimed in claim 19, wherein said channel information comprises at least one of channel position, channel number, interleaving step size, and quality of service.

24. The method as claimed in claim 19, comprising:

determining a destination in dependence on said input address and channel information.

25. A non-transitory computer readable medium arranged to store instructions that administer a computer aided design tool, the instructions configured to perform a method to configure a device, the method comprising:

generating computer code to represent a default version of the device, wherein the default version of the device includes a plurality of different networks formed via at least two network interfaces, at least two routers, at least two links coupling the at least two network interfaces through the at least two routers, and a processor to control programming of the at least two network interfaces;

modifying the computer code to provide electronic device access availability information for the device indicating which one or more of the plurality of different networks is available in the device, each available network having an electronic device access parameter set; and modifying the computer code to provide electronic device access defining information for each available electronic device access parameter set, each available electronic device access parameter set having:
- a number of channels formed in one or more sequences of adjacent contiguous memory ranges, wherein each channel is arranged to pass packet-based data via one or more of the at least two links, one or more of the at least two routers, and one or more of the at least two network interfaces,
- location information of said channels, and
- interleaving information associated with said channels.

26. The non-transitory computer readable medium of claim 25, wherein interleaving information comprises at least one of interleaving step size and location of an interleaved region in a channel, wherein said location of an interleaved region is defined by at least one of a start location and an end location.

27. The non-transitory computer readable medium of claim 25 arranged to store instructions configured to perform the method, the method comprising:

modifying the computer code to configure the device to:
- receive an input address;
- determine which electronic device access parameter set said input address is associated; and
- provide channel information associated with said input address.

28. The non-transitory computer readable medium of claim 27 arranged to store instructions configured to perform the method, the method comprising:

modifying the computer code to configure the device to:
- use said input address and location information to provide a channel information output;
- compare said input address and address range information to provide said channel information output; and
- provide a control signal to a channel information provider to cause channel information for said determined electronic device access parameter set to be output.

29. The non-transitory computer readable medium of claim 27, wherein said channel information comprises at least one of channel position, channel number, interleaving step size, and quality of service.

* * * * *